(12) United States Patent
Hörnig et al.

(10) Patent No.: US 8,009,052 B2
(45) Date of Patent: Aug. 30, 2011

(54) METHOD AND SYSTEM FOR MONITORING THE POWER STATE OF AN X-RAY EMITTER AND/OR AN X-RAY DETECTOR

(75) Inventors: Mathias Hörnig, Erlangen (DE); Thomas Mertelmeier, Erlangen (DE); Phillip Thaler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 12/444,900

(22) PCT Filed: Sep. 28, 2007

(86) PCT No.: PCT/EP2007/060329
§ 371 (c)(1),
(2), (4) Date: Apr. 9, 2009

(87) PCT Pub. No.: WO2008/043672
PCT Pub. Date: Apr. 17, 2008

(65) Prior Publication Data
US 2010/0097229 A1    Apr. 22, 2010

(30) Foreign Application Priority Data
Oct. 13, 2006  (DE) .......................... 10 2005 048 608

(51) Int. Cl.
*G08B 17/12*    (2006.01)
(52) U.S. Cl. ........ 340/600; 340/619; 340/621; 340/622; 340/634; 378/10; 378/108; 378/117; 378/119; 378/207

(58) Field of Classification Search .................. 340/600, 340/619, 621, 622, 634; 378/10, 108, 117, 378/119, 207
See application file for complete search history.

(56) References Cited

U.S. PATENT DOCUMENTS

| | | | |
|---|---|---|---|
| 4,996,413 A * | 2/1991 | McDaniel et al. | 250/208.1 |
| 5,668,850 A | 9/1997 | Abdel-Malek | |
| 6,505,966 B1 | 1/2003 | Guru | |
| 7,295,651 B2 * | 11/2007 | Delgado et al. | 378/92 |
| 2002/0117613 A1 | 8/2002 | Aufrichtig et al. | |
| 2005/0111610 A1 * | 5/2005 | De Man et al. | 378/10 |
| 2005/0163284 A1 | 7/2005 | Imazuru | |
| 2006/0120514 A1 | 6/2006 | Joerger et al. | |
| 2007/0071173 A1 | 3/2007 | Nederpelt | |

FOREIGN PATENT DOCUMENTS

GB    2 374 267 A    10/2002

* cited by examiner

*Primary Examiner* — Tai T Nguyen
(74) *Attorney, Agent, or Firm* — Schiff Hardin LLP

(57) ABSTRACT

In a method and system for monitoring the power state of an x-ray emitter and/or an x-ray detector, the x-ray emitter is operated according to a set of test parameters, so as to emit x-rays that strike at least a portion of the detector region of the x-ray detector. At least one value characterizing the operation of the x-ray emitter and/or the x-ray detector is determined, and this detected parameter is compared with a comparable reference parameter value. The power state of the x-ray emitter and/or the x-ray detector is determined based on deviation of the detected parameter from the reference parameter.

26 Claims, 3 Drawing Sheets

METHOD AND SYSTEM FOR MONITORING THE POWER STATE OF AN X-RAY EMITTER AND/OR AN X-RAY DETECTOR

BACKGROUND OF THE INVENTION

1. Field of the Invention

The present invention concerns a method for monitoring the power state (power status) of an x-ray radiator and/or an x-ray detector. The invention additionally concerns a system to implement such a method.

2. Description of the Prior Art

An x-ray radiator and an x-ray detector are normally components of an x-ray device. The x-ray radiator serves to generate and to radiate x-rays, the x-ray detector to detect x-rays. X-ray devices today have found usefulness in the most varied technical fields, which has resulted in the dissemination of x-ray radiators and x-ray detectors in these fields. For example, material sciences, safety engineering and medical engineering are among these technical fields in which x-ray radiators and x-ray detectors are used.

In particular in medical engineering it is desirable to keep the x-ray exposure of a subject to be examined as low as possible. For this purpose, it is necessary that the x-ray radiator and x-ray detector have a power state situated within certain specification limits in order to ensure a sufficient image quality. For example, the power state of the x-ray radiator encompasses properties of the x-rays that can be radiated by the x-ray radiator, in particular the intensity of the x-rays as well as their spatial (advantageously homogenous) distribution over an x-ray beam diameter. The power state of an x-ray detector normally involves properties of the x-ray detector that have an effect on the image quality in the detection of x-rays.

A failure of the x-ray radiator and/or x-ray detector or a significant reduction of the image quality that can be achieved by means of the x-ray radiator and x-ray detector is undesirable during clinical operation, in particular while conducting an x-ray examination of a patient. A particular disadvantage is that a repetition of the radiation exposure for the subject to be examined may be required by the physician to enable the diagnosis given a failure of the x-ray radiator and/or of the x-ray detector during the examination of the subject. This has the result of an increase radiation exposure for the subject to be examined.

The image quality is significantly influenced by the intensity of the x-rays striking the x-ray detector, the subject to be irradiated, and the properties of the x-ray radiator and x-ray detector. For example, the noise response of the x-ray detector, the signal-to-noise ratio and the quantum efficiency of the x-ray detector are significant parameters characterizing the power state—for example image quality or sensitivity—of the x-ray detector.

These properties of the x-ray detector and/or x-ray radiator that are essential to the image quality can change over time, in particular to the detriment of the image quality. If these properties of the x-ray radiator and/or x-ray detector change significantly in the course of time, such that the image quality of x-ray exposures produced with them no longer appears to be sufficient to achieve an examination goal, an exchange of the x-ray radiator and/or of the x-ray detector is necessary. This leads to an increased downtime of the x-ray detector, as well as to an increased radiation exposure of the patient since a new radioscopy of the patient with x-rays is required.

The causes for the degradation of the image quality can lie both in an x-ray detector and in an x-ray radiator. In an x-ray detector that directly converts the x-rays into an electrical signal (using amorphous selenium to detect x-rays, for example), a degradation of the image quality can be caused by localized re-crystallization of the amorphous selenium within the x-ray detector matrix detecting the x-rays, for example.

A degradation of the image quality (for example due to high operating temperatures of the scintillation crystal) can also occur in indirectly converting x-ray detectors, which normally operate with a scintillation crystal (possibly a thallium-doped sodium iodide crystal or a sodium-doped cesium iodide crystal).

An aging which leads to a degradation of the image quality can likewise occur in an x-ray radiator. In particular, the aging can affect the anode of the x-ray radiator as well as the focal ring thereof, by the focal ring becoming roughened and melted at points by the tube current in the generation of the x-rays. This leads to a decrease of the x-ray radiation power with time given otherwise constant operating conditions or operating parameters of the x-ray radiator (for instance tube voltage and tube current).

SUMMARY OF THE INVENTION

An object of the invention is to provide a method and a system that improve the monitoring of a power state of an x-ray radiator and/or an x-ray detector.

The object is achieved according to the invention by a method for monitoring a power state of an x-ray radiator and/or an x-ray detector, wherein (at least for the x-ray radiator) a set of predeterminable test parameters is selected, x-rays emanated by the x-ray radiator strike at least a partial region of the x-ray detector and are detected by the x-ray detector, at least one parameter characterizing the x-ray radiator and/or at least one parameter characterizing the x-ray detector is detected, the at least one detected parameter is compared with a reference parameter corresponding to the detected parameter, and a deviation of the detected parameter from the reference parameter is used as a measure of the power state of the x-ray radiator and/or of the x-ray detector.

For example, the test parameters for the x-ray radiator can be the tube voltage of the x-ray tube comprised by the x-ray radiator or even the tube current striking an anode of the x-ray tube to generate x-rays. The type of anode that is used is also relevant to the generation of the x-rays, possibly an operating temperature, the time of the current flow of the tube current, x-ray filters used etc.

The power state of the x-ray radiator (in particular of the x-ray tube) can be determined using the x-ray efficiency. The power emitted as x-rays is thereby set in relation to the supplied electrical power. The x-ray efficiency can decrease due to aging of the x-ray tube. It is advantageous to be able to monitor the decrease of the x-ray efficiency in order to detect a superannuated x-ray tube as early as possible and be able to exchange it. A repeated radiation exposure of the patient by a need to conduct another examination thus can be avoided.

Reference characteristic lines (acquired from reference x-ray radiators with the respective anode type, for example) exist for monitoring the power state of the x-ray tube. Such reference characteristic lines allow a deviation of the real power state of the tested x-ray radiator from a desired power state (which is predetermined by the reference x-ray radiator) to be determined for an arbitrary set of test parameters.

The intensity of the x-rays that strike at least a portion of the x-ray detector is detected to determine the x-ray efficiency. Using the intensity, the x-ray power can be determined and ascribed to the x-ray efficiency. Alternatively, intensities with regard to the respectively used set of test parameters can be directly used for the comparison of x-ray radiator and reference x-ray radiator.

It is taken into account that a measured x-ray intensity of x-rays emanating from an x-ray radiator can also be affected by the x-ray detector. This is also subject to an aging process. Therefore it is also appropriate to detect parameters for the x-ray detector which reflect its power state or, make the real power state of the x-ray detector comparable to a desired power state predetermined by a reference x-ray detector. The most varied parameters for the x-ray detector are available for this purpose. For example, the quantum efficiency, the distribution of x-ray detector noise or the signal-to-noise ratio can be used as parameters characterizing the x-ray detector.

If such a real parameter of the x-ray radiator and/or of the x-ray detector shows a deviation relative to corresponding desired parameters of the x-ray detector that are predetermined by a reference detector, a correction of the measured intensity of the x-rays can be done using a suitable characteristic line collection, for example. For this purpose, the value of the measured intensity is corrected with a correction value dependent on the power state of the x-ray detector. A power state corresponding to reality and unaffected by the x-ray detector can thereby be determined for the x-ray radiator.

The reference parameters for a number of different sets of test parameters are advantageously provided by the manufacturer of the x-ray radiator and/or of the x-ray detector. Alternatively, the vendor of the x-ray detector can provide such characteristic line collections in a direct or indirect manner.

The reference parameters can also be determined after the x-ray device has been placed in operation in the facility (for example a clinic or a physician's practice) using the x-ray device, with the x-ray device placed in operation. In particular, a time curve of the deviation from an initial power state of the x-ray radiator and/or of the x-ray detector to a later power state of the same x-ray radiator and/or the same x-ray detector can be determined.

In an embodiment of the invention, the set of predeterminable test parameters of the x-ray radiator coincides with a set of examination parameters for the examination of a subject, with the at least one parameter being detected substantially simultaneously with an examination of the subject. By combining the monitoring of the power state of the x-ray radiator and/or of the x-ray detector with an x-ray examination of a subject, the monitoring of the power state of x-ray radiator and/or x-ray detector can be conducted in parallel with an examination that is to be conducted anyway, without additional expenditure of time.

The method for monitoring the power state of the x-ray radiator and/or of the x-ray detector thus does not affect the patient throughput. Rather, a high patient throughput leads to an improved monitoring since, if desired, more data for monitoring the power state of x-ray radiator and/or x-ray detector can be generated.

The x-rays emanating from an x-ray radiator are thus simultaneously used for the examination of a subject and for the monitoring of the power state of the x-ray radiator and the x-ray detector. The examination parameters—for example hardness of the x-rays (adjustable by means of the tube voltage, for example), dose of the x-rays (adjustable via the tube current, for example)—are selected according to a purpose prompting the examination of the subject.

Successive examinations, possibly on different subjects or patients, can differ in their examination parameters since they can track different examination goals. It is necessary to provide the reference parameters encompassing the x-ray radiator and/or the x-ray detector for a number of test parameters in order to be able to implement a comparison of the at least one corresponding reference parameter with the detected parameter. The value of the selected test parameter for the monitoring of the power state of the x-ray radiator and/or of the x-ray detector is therefore normally not constant.

The adjustable test parameters or examination parameters for the x-ray radiator and/or the x-ray detector as well as the parameters predetermined by the environment form a parameter space. To enable the implementation of the method according to the invention with suitable precision, it is necessary to provide reference parameters for the entire parameter space—but at least for the parameter space formed by the adjustable test parameters—for comparison with the parameters encompassed by the set test parameters for the x-ray radiator and/or x-ray detector.

The detection of parameters for the monitoring of the power state of x-ray radiator and/or x-ray detector allows frequent monitoring of the power state of x-ray radiator and/or x-ray detector without having to make an additional time expenditure for the monitoring of the power state of the x-ray radiator and/or x-ray detector necessary. The time curve of the power state of the x-ray radiator and/or x-ray detector can thereby also be determined with a sufficiently high number of measurement values, and therefore with a high measurement certainty.

The influence of the examination parameters used for the examination of the subject on the power state of the x-ray radiator and/or the x-ray detector can additionally be determined given such an implementation of the method via the provision of a large set of measurement data which pertain to the power state of x-ray radiator and/or x-ray detector. These measurement data can be evaluated or used by the manufacturer of an x-ray tube and/or an x-ray detector in order to identify and correct weak design points of the x-ray detector and/or of the x-ray radiator.

Given an essentially simultaneous acquisition of a projection of a subject and the detection of at least one parameter for the monitoring of the power state of x-ray radiator and/or x-ray detector, it is particularly advantageous to detect the at least one parameter by utilizing only a portion of the region of the x-ray detector that is not required for the examination of the subject. By the spatial division of a detector surface of an x-ray detector into a first region that serves for the acquisition of an image of the subject for the purpose of the examination and/or treatment and a second region that serves for the detection of the parameters of the x-ray radiator and/or x-ray detector, a simultaneous implementation of the detection of the parameters for monitoring the power state of the x-ray radiator and/or of the x-ray detector, and the examination of the subject, is enabled in a simple manner.

By providing at least two regions of the x-ray detector at least one test subject can be located between the x-ray radiator and the x-ray detector to detect the at least one parameter, the test subject being at least partially penetrated by the x-rays emanating from the x-ray radiator. For example, the test subject can be fashioned as an edge test phantom or as a phantom to determine the resolution of the x-ray detector. The phantoms for such tests are advantageously produced from lead. At least one test subject made from a different material than lead can also be provided for the detection of the at least one parameter for monitoring the power state of the x-ray radiator and/or of the x-ray detector. For example, the test subject can be fashioned as a water phantom that is located between the x-ray radiator and the x-ray detector.

In another embodiment of the invention, a time curve of the power state for x-ray radiator and/or x-ray detector is determined from the at least one parameter detected at different points in time. The determined parameters (normally with regard to a different set of test parameters or set of examination parameters) are thereby advantageously presented such that they have the same test parameters or examination parameters. In order to achieve this, the detected parameter is retrievable in each implementation of the method for monitoring the power state of the x-ray radiator and/or the x-ray detector. Furthermore, the characteristic line of the x-ray radiator or the x-ray detector, which reflects the power state of the x-ray radiator and/or the x-ray detector under the test parameters used to detect the parameters, is associated with the detected parameter.

In order to be able to promote comparability between a parameter detected at a first point in time and with a first set of test parameters, with a parameter detected at a second point in time and with a second set of test parameters, at least one of the parameters is shifted along its associated characteristic line until the at least one parameter detected at a first point in time and the corresponding parameter detected at a second point in time exhibit an identical set of test parameters.

The set of test parameters that is associated with a parameter by shifting on its associated characteristic line can advantageously be predetermined and does not need to coincide with a set of tests parameters which were selected for detection of one of the parameters.

The parameters determined in such a manner (i.e. directly comparable parameters detected at different points in time and normally with a different set of test parameters) are advantageously graphically presented so that (for example) technical or medical personnel can track, without additional measures, the time curve of a parameter or the time curve of the power state of the x-ray radiator and/or the x-ray detector that can be determined or derived from the parameter.

For example, a power state of the x-ray radiator and/or of the x-ray detector characterized by a detected parameter, and that occurred at a point in time of the error-free start-up of the x-ray radiator and/or of the x-ray detector with approval of the manufacturer, can be designated with 100 percent. If a certain threshold for the power state (measured in this case as a value number) of the x-ray radiator and/or of the x-ray detector is reached, for example 75 percent, the user of the apparatus is automatically notified to conduct a technical inspection of x-ray radiator and/or x-ray detector in the near future. A further degradation of the power state of the x-ray radiator and/or of the x-ray detector, or a complete failure of x-ray radiator and/or x-ray detector, can possibly be avoided.

In a further embodiment of the invention, the remaining service life for x-ray radiator and/or x-ray detector is determined from a time curve of the at least one parameter. The determination of the remaining service life is normally based on considerable experience of the manufacturer of an x-ray radiator and/or x-ray detector and/or on the experience of a manufacturer of an x-ray device that includes an x-ray radiator and/or an x-ray detector. This technical experience or this know-how can additionally be used by determining the remaining service life for an x-ray radiator and/or x-ray detector from the time curve of the parameter or of the power state.

A failure of an x-ray radiator and/or x-ray detector thus does not occur as a surprise. An exchange of an x-ray radiator and/or x-ray detector with poor power state can thus be planned, such that the time expenditure required for the exchange of x-ray radiator and/or x-ray detector does not burden patients. Rather, a replacement x-ray device can be provided according to plan during the downtime of the affected x-ray device for the purpose of exchanging an x-ray radiator and/or x-ray detector with poor power state.

In another embodiment of the invention, the at least one parameter and/or a deviation of the at least one parameter from the corresponding reference parameter is transmitted to a monitoring device. The monitoring device can be provided as a decentralized or centralized monitoring device. A decentralized monitoring device (meaning that a separate monitoring device is associated with every x-ray device on site) has the advantage that the system embodying the monitoring device and the x-ray device operates independently, without data transfer over large distances. The risk of error in data transfer processes or data transmission processes from the x-ray detector to the monitoring device and in reverse is thereby reduced.

Alternatively, a central monitoring device can be provided that monitors a number of x-ray radiators and/or x-ray detectors or x-ray devices that are geographically distributed (for example in one country). A centralized monitoring device is advantageously operated by the manufacturer of the x-ray device and/or by the manufacturer of the x-ray radiator and/or x-ray detector, or by a service provider designated for this purpose.

The monitoring device advantageously automatically polls (continuously or at regular time intervals) the detected and stored parameter characterizing the x-ray radiator and/or the at least one detected and stored parameter characterizing the x-ray detector for the x-ray device (operated in a clinic or in a practice, for example). The polled parameter is transmitted together with the test parameters or examination parameters associated with said respective parameters to the monitoring device and all parameters are at the site of the monitoring device stored.

In the case of central monitoring device, the data polling can normally be conducted for a number of delivered x-ray devices placed in operation. By evaluating the polled parameters, the manufacturer of the x-ray device or the manufacturer of the x-ray radiator and/or x-ray detector can always receive an overview of the power state of the delivered x-ray radiator and/or x-ray detector found in operation. Through such a method the manufacturer additionally receives information about the performance, in particular service life or specific errors of specific anode types etc. and can conduct statistical analyses regarding the manufacturer's products by means of such data.

For a centralized monitoring device, the technical data of an x-ray radiator and/or of an x-ray detector—for instance the number of characteristic lines for different power states and different sets of test parameters—are stored on the monitoring device, for example in a database. With the use of centralized monitoring device, the manufacturer divulges no technical know-how—for example the number of characteristic lines about the aging and the wear of x-ray radiators and/or x-ray detectors—to potential competitors. Nevertheless, the power state of an x-ray radiator and/or an x-ray detector can be monitored promptly and without greater effort with such a centralized monitoring device (also frequently designated as a remote system).

With a decentralized monitoring device, the technical data for x-ray radiator and/or x-ray detector are normally present on site at every delivered x-ray device with an x-ray radiator and/or x-ray detector to be monitored.

If the evaluation by the centralized or decentralized monitoring device shows that a predetermined parameter threshold of the at least one parameter characterizing the x-ray radiator and/or the x-ray detector has been exceeded, a perceptible warning signal can be triggered by the monitoring device for a user of the x-ray radiator and/or x-ray detector. For this purpose, a signal is transmitted from the monitoring device to the appertaining x-ray device, which then generates a signal perceptible to a user (for example as a graphic display or as an acoustic signal). Different parameter thresholds can be defined that are associated with different power states of an x-ray radiator and/or an x-ray detector.

A parameter threshold that is associated with a power state can characterize, for example, that power state at which a servicing of the x-ray radiator and/or of the x-ray detector is to be conducted, or that only a specific service life is possible for x-ray radiator and/or x-ray detector, or that an immediate failure of x-ray radiator and/or x-ray detector is about to occur etc. The warning signal triggered by the monitoring device is advantageously adapted to the respective parameter threshold that has been exceeded.

In an embodiment of the invention, the at least one parameter characterizing the x-ray detector is the spatial noise distribution of an x-ray detector matrix. The x-ray detector matrix is composed of a number of x-ray detector matrix elements that can respectively be associated with a column and a row of the x-ray detector matrix. In an x-ray image acquisition, an x-ray detector matrix element normally corresponds to one image point or one pixel of the acquired image.

The spatial noise distribution of an x-ray detector matrix is normally a measure for a power state of the x-ray detector. If a temporal variation of the spatial distribution of the noise occurs, the cause for this normally lies in a variation of the detector material, for example in the re-crystallization of amorphous selenium into crystalline selenium given the use of amorphous selenium. These variations of the detector material can occur in a locally limited manner in the x-ray detector matrix. However, a signal delivered by such an affected x-ray detector matrix element normally leads to a decrease of the image quality of the acquired x-ray image, for example.

However, such conditional variations of the noise can be detected by (for example) the average spatial noise being detected for each x-ray detector matrix element or, for each detector pixel.

Alternatively, at least one parameter characterizing the x-ray detector can be row noise of the x-ray detector matrix and/or the column noise of the x-ray detector matrix. Column noise and/or row noise can likewise indicate the power state of an x-ray detector. However, the entire x-ray detector matrix is normally not read out, rather only rows and/or columns of the x-ray detector matrix, A power state of the x-ray detector can also be determined with the use of the quantum efficiency as the parameter characterizing the x-ray detector. The quantum efficiency of the x-ray detector is an essential criterion for an x-ray detector which significantly affects the sensitivity of the x-ray detector to x-rays. The signal-to-noise ratio can also be used as the parameter characterizing the x-ray detector. The cited parameters (such as noise, quantum efficiency, signal-to-noise ratio etc.) can also be detected in combination in order to be able to determine the power state of the x-ray detector with greater certainty than by detection of only a single parameter characterizing the x-ray detector.

In a preferred embodiment of the invention, the parameter characterizing the x-ray radiator is formed as a measure of the intensity of the x-rays emitted by the x-ray radiator. The emitted intensity of the x-rays given a predetermined set of test parameters is a significant criterion for the assessment of a power state of an x-ray radiator. It is therefore appropriate to detect a parameter correlated with the intensity for the monitoring of the power state of the x-ray radiator or, to use the intensity of the x-rays itself as a parameter for the x-ray radiator.

The above object is likewise achieved by a method to monitor a power state of an x-ray detector, wherein at least one parameter characterizing the x-ray detector is detected with a set of predeterminable test parameters, the at least one parameter characterizing the x-ray detector is compared with at least one corresponding reference parameter, and a deviation of the detected parameter characterizing the x-ray detector from the reference parameter is used as a measure for a power state of the x-ray detector. Such a method to monitor the x-ray detector can be conducted without exposure of the x-ray detector with x-rays emanating from an x-ray radiator, i.e. by means of a dark measurement.

A constant set of test parameters is advantageously used in the method for monitoring the x-ray detector. For example, a cover hood (which can be tempered) can be used for this which surrounds or covers the x-ray detector. The cover hood is advantageously fashioned such that x-rays can be absorbed with it. It is thereby prevented that naturally occurring x-rays are detected and the dark measurement is disrupted by their detection.

For this method, parameters which are not based on an exposure of the x-ray detector with x-rays can be used as the parameters characterizing the x-ray detector. Row noise and/or column noise and/or matrix element-resolved noise can be advantageously used as the parameter characterizing the x-ray detector.

The above object is also a system for monitoring a power state of an x-ray radiator and/or and x-ray detector, having components to implement the method described above as well as all embodiments thereof.

DESCRIPTION OF THE PREFERRED EMBODIMENTS

In the following, the system shown in FIG. 1 for monitoring the power state of a number of x-ray radiators and x-ray detectors is explained in connection with the flowchart shown in FIG. 2. Reference characters of device components refer to FIG. 1, and reference characters of method steps refer to FIG. 2.

Figure 1:
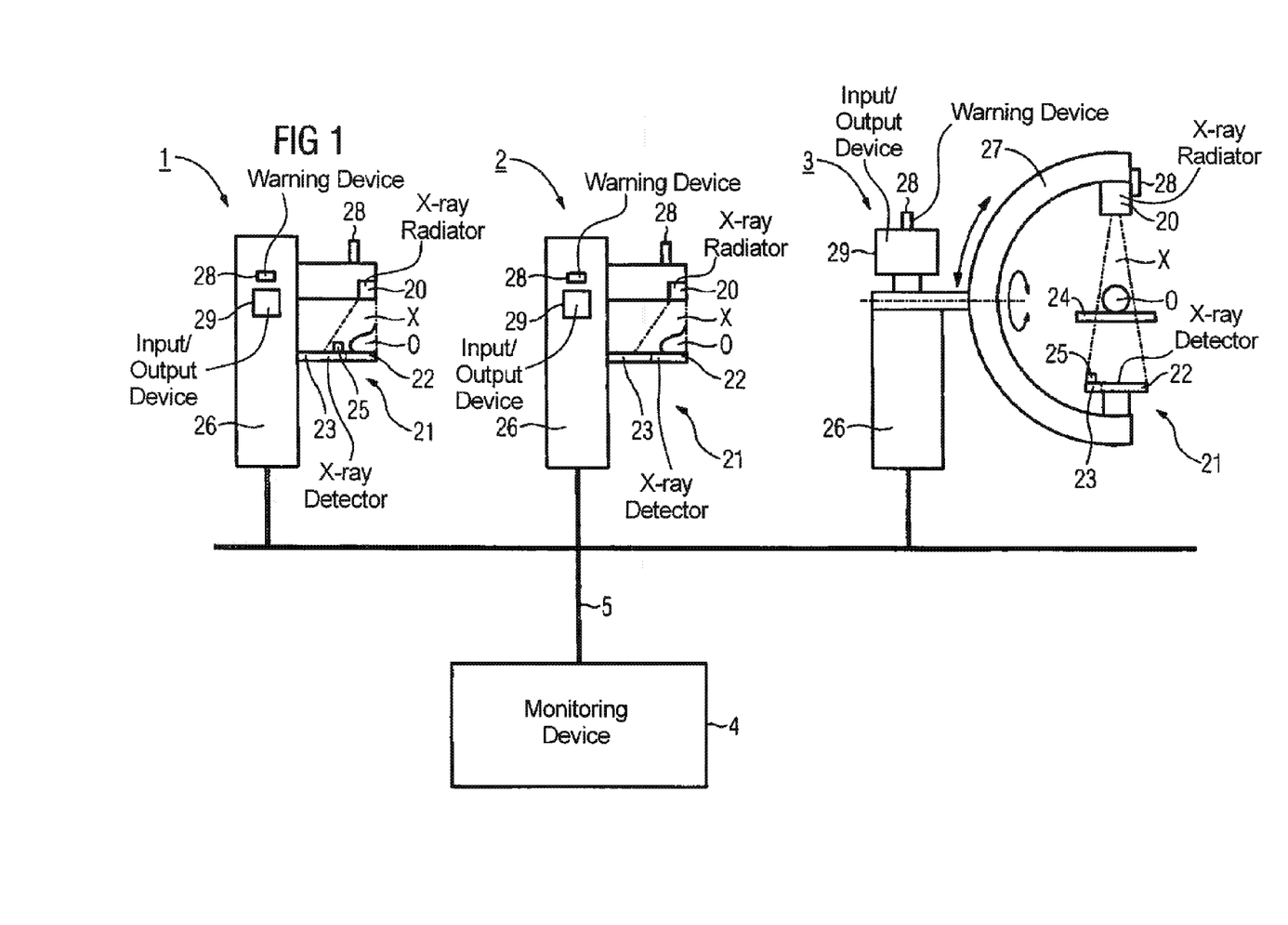
FIG. 1 schematically illustrates a system for monitoring the respective power states of a number of x-ray radiators and x-ray detectors, the system having multiple x-ray devices all monitored by a central monitoring device.

The system presented in FIG. 1 for monitoring a power state of an x-ray radiator and of an x-ray detector shows three x-ray devices which are fashioned as a first mammography device 1, a second mammography device 2 and a C-arm x-ray device 3. The x-ray device 1 or 2 or 3 is connected with a central monitoring device via a data line 5. Moreover, the monitoring device 4 is connected via the data line 5 with additional x-ray devices (not shown).

The first mammography device 1, the second mammography device 2 and the C-arm x-ray device 3 are positioned at different locations, for example as components of a technical configuration of various clinics, hospitals and physician's practices. The mammography devices 1 and 2 as well as the C-arm x-ray device 3 respectively possess an x-ray radiator 20 and an x-ray detector 21 which are borne on a stand unit 26. The task of the central monitoring device 4 is to centrally monitor the power state for a number of x-ray radiators 20 and x-ray detectors 21 operated in the practices and in clinics.

In order to enable the monitoring of the power state of the x-ray radiator 20 and the x-ray detector 21, the monitoring device 4 is connected via the data line 5 with the x-ray devices 1 or 2 or, 3 and additional x-ray devices (not shown) whose x-ray radiator 20 and x-ray detectors 21.

The monitoring device 4 has access to a database in which reference parameters are stored, advantageously for all types of x-ray radiators 20 and all types of x-ray detectors 21 to be monitored. The reference parameters for a number of different sets of test parameters for the x-ray radiator 20 and for the x-ray detectors 21 are stored in the database.

Examples of test parameters of the x-ray radiator are the type of anode comprised by the x-ray radiator, the operating temperature of the anode, the tube current used to generate the x-rays, the tube voltage used to generate the x-rays etc.

The reference parameters are normally stored in the database as a component of reference characteristic lines, wherein the reference characteristic lines exist for a number of different sets of test parameters. If a set of test parameters is known, the associated reference parameter can be determined from the associated reference characteristic line. The reference characteristic lines in a sufficiently large selected test parameter space should be known so that a reference parameter for the test parameter used in practice can always be determined from a characteristic line stored in the database.

The test parameter space is spanned by the number of variable test parameters and the respective bandwidth of the value range of the test parameter that is traversed. For example, reference characteristic lines can additionally be added which cover the test parameter space for different service lives of the x-ray radiator and the x-ray detector, or for x-ray exposures of various phantoms with regard to different sets of test parameters. However, this multiplies the characteristic lines to be provided for a test parameter space.

Since the determination of the reference characteristic lines for a test parameter space with multiple test parameters over a larger value range of the test parameters with an advantageously small step width (for the purpose of precision of the monitoring) and, for example, for x-ray radiators and/or x-ray detectors of different ages is complicated, the reference characteristic lines for x-ray radiator and x-ray detector are advantageously determined only for the test parameter space or, examination parameter space which is relevant in practice—for example in the clinics and physician's practices.

Interpolation algorithms which interpolate reference characteristic lines for an unrecorded set of test parameters (insofar as an interpolation can ensue on the basis of the known reference characteristic lines for multiple known sets of test parameters with a desired precision and accuracy) can possibly also be used to determine reference characteristic lines. Such algorithms allow a larger step width for the test parameters in the acquisition of the number of reference characteristic lines for the database, whereby the effort to determine the reference characteristic lines can be reduced.

In the exemplary embodiment, the mammography devices 1 and 2 as well as the C-arm x-ray device 3 are normally operated at different points in time since these are normally loaded with subjects 0 in a different manner. Nevertheless, the x-ray radiators 20 and the x-ray detectors 21 of the x-ray devices 1 through 3 or the power state of the x-ray radiator 20 and x-ray detector 21 associated with the respective x-ray device 1 or 2 or 3 should be monitored sufficiently often without thereby causing downtimes of the x-ray device 1 or 2 or 3.

A monitoring of the power state of the x-ray radiators 20 and of the x-ray detectors 21 can ensue by means of the method according to the invention without a reduction of the patient throughput.

For example, in a method step 101 it is decided whether a monitoring according to the invention of the power state of the x-ray radiator and of the x-ray detector of the used x-ray device 1 or 2 or 3 should ensue given an implementation of an x-ray examination by means of at least one x-ray device 1 or 2 or 3 in which the subject O to be examined is exposed with x-rays X.

If the joint detection of at least one parameter characterizing the x-ray radiator 20 and/or the x-ray detector 21 and the examination of a subject O is provided, in a method step 102 the subject O is positioned at the x-ray device 1 or 2 or 3 for implementation of the examination.

In a method step 102, the examination parameters or test parameters are subsequently selected that—in the case of a joint detection of the at least one parameter for x-ray radiator and/or x-ray detector and the projection of a subject O—are adapted to the examination goal for the subject O.

Given an essentially simultaneous detection of parameters and implementation of an examination on a subject O, it is appropriate that the respective x-ray detector 21 associated with an x-ray device 1 or 2 or, 3 possesses a first partial region 22 and a second partial region 23. The first partial region 22 is provided for the detection of the x-rays X passing through the subject O to be examined. The second partial region 23 is provided to detect x-rays X that are not passing through the subject O and serve for the monitoring of the power state of the x-ray radiator 20 or of the x-ray detector 21.

In the mammography devices 1 and 2 shown in FIG. 1, the second partial region 23 of the x-ray detector 21 advantageously lies on the side of the x-ray detector 21 situated opposite or facing away from the subject side of the x-ray detector 21.

At least one test subject 25 for the implementation of the radiation exposure of the subject O to be examined can also be provided on this second partial region 23 (which normally serves only for the monitoring of the power state of the x-ray radiator 20 and the x-ray detector 21). The use of a test subject 25 is decided in a method step 103. If a test subject 25 should be used, this is positioned in a desired manner on the second partial region 23 of the x-ray detector 21 in a method step 104.

Alternatively, a permanent positioning of the test subject 25 on the second partial region 23 of the x-ray detector 21 can be provided by default. If it is therefore decided in method step 103 that no test subject 25 should be used, the test subject is removed from the partial region 23 of the x-ray detector 21 in a method step that is not shown in FIG. 2.

The test subject 25 can be fashioned as an edge phantom, for example, or serve to determine the resolution of the x-ray detector. The imaging quality of edges or, the resolution of the x-ray detector 21 is thus also a parameter characterizing the x-ray detector 21 for which reference parameters for the monitoring device 4 are advantageously available.

In a method step 102', the test parameters or examination parameters are set so that an examination goal for the subject O to be examined is achieved. The examination parameters for the mammography devices 1 and 2 as well as the C-arm x-ray device 3 normally differ, for example in the hardness of the x-rays, in the x-ray dose etc., which examination parameters depend on the examination goal of the x-ray examination and on the examined subject.

During the acquisition of a projection (generated by means of x-rays X) of the subject O to be examined with the first partial region 22 of the x-ray detector 21, at least one parameter for the x-ray detector 21 and at least one parameter for the x-ray radiator 20 is detected with the second partial region 23 of the x-ray detector 21, for example. In order to enable the projection of the subject O and the detection of the parameter, in a method step 105 x-rays X emanating from the x-ray radiator 20 are radiated in the direction of the x-ray detector 21, in particular the partial regions 22 or 23.

The parameter for the x-ray detector 21 here is formed as a spatial distribution of an x-ray detector noise over an x-ray detector matrix in the second partial region 23 of the x-ray detector 21, wherein the second partial region 23 of the x-ray detector 21 exhibits a size of 256 by 4096 pixels. The parameter characterizing the x-ray radiator 20 is the x-ray intensity striking the second partial region 23 of the x-ray detector 21.

The set examination parameters or test parameters and possibly also additional parameters (for instance the environment temperature) are recorded detected, are stored together with the detected parameters and are associated with said detected parameters such that they can be retrieved. Since the detection of the parameters ensues during an examination of a subject O to be examined, in this case the examination parameters are the same as the test parameters.

Alternatively, a monitoring the power state of the x-ray radiator 20 and of the x-ray detector 21 can be conducted independent of an occurring examination on a subject O to be examined. This can be necessary, for example when an x-ray device 1 or 2 or 3 has not been operated over a longer period of time and therefore it is unclear what power state the x-ray radiator 20 or the x-ray detector 21 has. A start-up of such an x-ray radiator 20 or x-ray detector 21 on a subject O (in particular a living subject O) would lead to an endangerment of the subject O, which is why a detection of the parameters to monitor the power state of x-ray radiator 20 and/or x-ray detector 21 independent of the examination of the subject is preferred.

However, in the exemplary embodiment at least one parameter is detected in a method step 106 during the implementation of an examination, in particular during the radiation exposure of the subject O. The at least one parameter is advantageously stored together with the known test parameters in an additional method step 107 such that they can be retrieved, which storage ensues by means of a storage device (not shown in FIG. 1) provided for the respective x-ray device 1 or 2 or 3.

In a method step 108 the monitoring device 4 polls the stored parameters (together with the test parameters associated with the detected parameters) for the x-ray radiator 20 and the x-ray detector 21 for the x-ray devices 1, 2 and 3 at determined time intervals, for example at regular time intervals, for instance daily, hourly or continuously. These data are thereupon transmitted from the respective x-ray device 1 or 2 or 3 to the monitoring device 4 in a method step 109.

In a method step 110 the monitoring device 4 associates a related reference parameter (which can be taken from the reference characteristic lines) with the at least one detected and transmitted parameter. The association of the detected parameter with the corresponding reference parameter according to method step 110 is followed by a comparison of the detected parameter with the reference parameter in method step 111. In method step 111, a deviation of the detected parameter from a corresponding reference parameter is determined by the comparison of detected parameter and reference parameter.

The method step 111 initially ensues for the parameter characterizing the x-ray detector 21. In the exemplary embodiment, the spatial noise distribution at the second partial region 23 of the x-ray detector 21 is analyzed for the x-ray detector 21 in that, for example, the noise is compared pixel by pixel with reference pixels corresponding to a noise. If a deviation of the detected parameter from a corresponding reference parameter (that, for example, originates from a reference x-ray detector functioning without error) hereby occurs, inferences of the power state of the x-ray radiator 20 cannot be drawn without further measures from the parameter detected by means of the x-ray detector 21.

If the parameter characterizing the x-ray detector 21 exhibits deviations from the reference parameter, a correction factor can be determined using the deviation of the parameter characterizing the x-ray detector 21 from the corresponding reference parameter, with which correction factor the detected parameter characterizing the x-ray radiator 20 is corrected.

The corrected parameter characterizing the x-ray radiator is first subsequently associated with a corresponding reference parameter and compared therewith. The reference parameter thereby originates from, for example, a reference x-ray radiator that is in mint condition, operating without error, structurally identical and operated under otherwise identical test parameters. If, in spite of the correction of the detected parameter characterizing the x-ray radiator 20, a deviation occurs between corrected parameter and corresponding reference parameter, this is normally an indication of a degradation of the power state of the x-ray radiator 20 relative to a reference x-ray radiator that is in mint condition, operating without error, otherwise structurally identical and operated under identical conditions.

Alternatively, a comparison of the detected parameter for x-ray radiator 20 and x-ray detector 21 can be conducted such that corresponding reference parameters (i.e. reference parameters existing with an identical set of test parameters but for a number of different aging states for x-ray radiator 20 and x-ray detector 21) are compared with the detected or corrected parameter. In such a comparison, detected or corrected parameters are compared with the corresponding reference parameter for different aging states until the deviation between detected or, corrected parameter and reference parameter is minimal or zero.

The power state can thereby be defined as an aging state of the x-ray radiator 20 or, x-ray detector 21 used in the respective x-ray device 1 or 2 or 3, and a remaining service life for x-ray radiator 20 or x-ray detector 21 can possibly be determined.

An alternative way to determine an operating age of an x-ray radiator 20 and an x-ray detector 21 or a still-remaining service life for the x-ray radiator 20 and the x-ray detector 21 provides that the deviation of the parameter from the reference parameter (which originates from a reference x-ray radiator or reference x-ray detector that is in mint condition, operating without error, otherwise structurally identical and operated with an identical set of test parameters) is characteristic of the operating age of the x-ray radiator or of the x-ray detector.

Given a known characteristic time curve of a parameter characterizing the x-ray radiator 20 and/or the x-ray detector, an already-fulfilled service life or a remaining service life for x-ray radiator 20 or x-ray detector 21 can thus be concluded from the magnitude of the deviation of the detected or corrected parameter from the reference parameter.

At least one parameter threshold or, a parameter threshold value for a defined magnitude of the deviation of the detected or, corrected parameter from the corresponding reference parameter is thereby advantageously provided. The parameter threshold is, for example, exceeded when, for example, only a determined remaining but already critical service life is still provided for the x-ray radiator 20 and/or the x-ray detector 21. The at least one parameter threshold is thereby established using empirical tests conducted on the part of the manufacturer, for example, which tests reproduce the time curve of the power state of an x-ray radiator 20 and an x-ray detector 21.

The parameter threshold is advantageously selected such that an immediate failure of the x-ray radiator and/or of the x-ray detector is not imminent after the threshold is exceeded. Rather, after exceeding the parameter threshold a latitude should advantageously still exist in order to exchange the x-ray radiator 20 and/or the x-ray detector 21, for example (alternatively the entire x-ray device 1 or 2 or 3 before failure of the associated x-ray radiator 20 or x-ray detector 21).

An overrun of a parameter threshold is checked by the monitoring system 4 in a method step 112. A specific process to be executed by the monitoring device 4 can be associated with each provided parameter threshold, which specific process is automatically initiated by the monitoring device 4 upon exceeding the respective parameter. For example, the process can consist of sending a message to the user of the appertaining x-ray device 1 or 2 or 3.

Multiple parameter thresholds are advantageously provided which exhibit different deviations between detected or, corrected parameter and the reference parameter and therefore describe different power states of the x-ray radiator 20 or of the x-ray detector 21. An overrun of a parameter threshold established in method step 112 is advantageously automatically communicated both to the user of the respective x-ray device 1 or 2 or 3 and to the manufacturer and/or the repairer of the appertaining x-ray device 1 or 2 or 3 and/or also to the assigned service center.

The user of the x-ray device 1 or 2 or 3 thus has knowledge of the power state of the employed x-ray radiator 20 or the employed x-ray detector 21. The manufacturer also has knowledge of the current power state of x-ray radiator 20 and x-ray detector 21 of a specific x-ray device 1 or 2 or 3 and can introduce corresponding measures in order avoid downtimes of the x-ray device 1 or 2 or 3 or an endangerment of a subject O to be examined or, of the medical personnel due to the failure of an x-ray radiator 20 and/or an x-ray detector 21.

If a parameter threshold that is viewed as critical is exceeded, or if a sudden and drastic degradation of the power state of the x-ray radiator 20 and/or of the x-ray detector 21 occurs in an unforeseeable manner, in a method step 113 the monitoring device 4 can trigger a warning signal which notifies the user of the appertaining x-ray device 1 or 2 or 3 of an imminent failure of the x-ray radiator 20 and/or x-ray detector 21. The information about the danger status or, the triggered warning signal is transmitted to the appertaining x-ray device 1 or 2 or 3 in method step 115.

In method step 116, the x-ray device 1 or 2 or 3 checks the information transmitted from the monitoring device 4 for the presence of a warning notification. If the information transmitted to the appertaining x-ray device 1 or 2 or 3 in method step 115 contains a warning indicator, in method step 117 a warning signal is reproduced in an optical and/or acoustic manner via a warning device 28 arranged at the x-ray device 1 or 2 or 3. The user will thereupon no longer use the appertaining x-ray device 1 or 2 or 3 for the examination of a subject O until it is newly repaired in order to not expose the subject O or, a patient O to any unnecessary risk, in particular of an increased x-ray dose.

The warning device 28 is advantageously easily optically perceptible for the medical personnel, for example is arranged on a C-arm 27 of the x-ray device 3 or in another manner that is easily perceptible by the user on the mammography devices 1 or, 2. The reproduced warning signal can advantageously be unambiguously associated with a hazardous situation or, a specific power state of an x-ray radiator 20 or, an x-ray detector 21. For example, this can be ensured via an additional text display indicating the cause warning signal on the input/output device 29, or via an item of information acoustically (for instance spoken) directed toward the user in a situation-relevant manner.

If no overrun of a parameter threshold is established in the implementation of the method step 112, a remaining service life that is to be expected for the x-ray radiator 20 and the x-ray detector 21 is determined in method step 114. The determined remaining service life of the x-ray radiator 20 and the x-ray detector 21 that is to be expected is subsequently transmitted to the respective x-ray device 1 or 2 or 3 in method step 115. In a further method step 118, the determined and transmitted remaining service life for the x-ray radiator 20 and the x-ray detector 21 is indicated on the input/output device 29.

Alternatively, warning signals and information regarding the power state of the x-ray radiator 20 and/or the x-ray detector 21 that are to be transmitted can be transmitted jointly to the respective x-ray device 1 or 2 or 3.

For the C-arm x-ray device 3 (by means of which in particular a number of projections of a subject O can be acquired from different projection directions in order to determine a spatial representation of a subject O), the detection of a parameter for x-ray radiator and/or x-ray detector is advantageously conducted at least during an acquisition of one projection of the subject O. However, the detection of the at least one parameter can also be conducted for multiple or all projections to be acquired which are provided to determine the spatial depiction of the subject O.

The method for monitoring the power state of the x-ray radiator 20 and the x-ray detector 21 can also be conducted independent of an examination to be conducted on a subject O. However, this entails the disadvantage that a separate x-ray exposure must be conducted for the detection of a parameter, which normally reduces the lifespan of the x-ray radiator 20 and/or of the x-ray detector 21.

Figure 2:
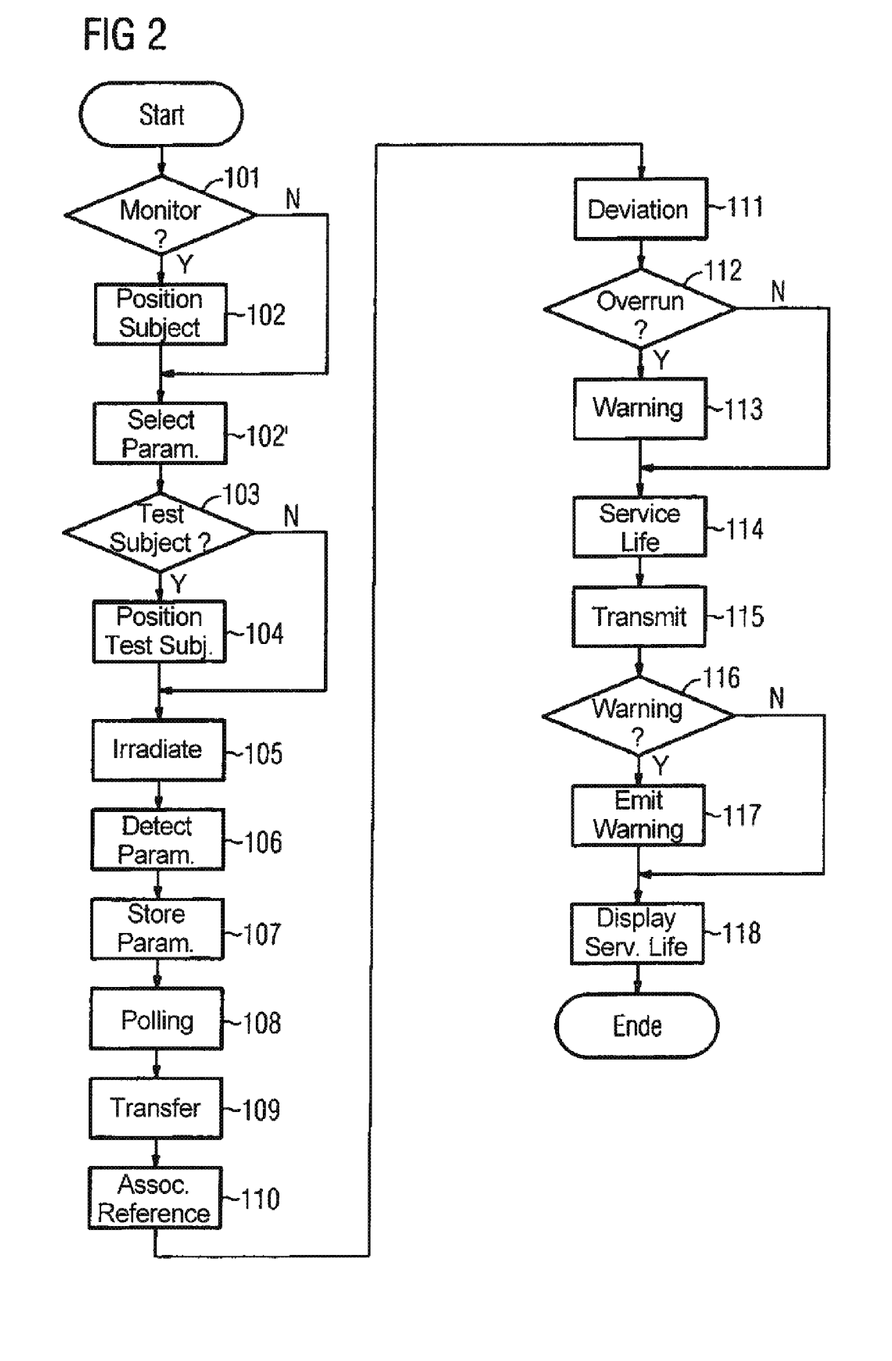
FIG. 2 is a flowchart of a first embodiment of a method for monitoring the power state of an x-ray radiator and/or an x-ray detector, in accordance with the present invention.

As an alternative to the system shown in FIG. 1 and the flow diagram shown in FIG. 2, a decentralized monitoring device 4 can respectively be provided for the x-ray devices 1 through 3 that are presented in FIG. 1, which decentralized monitoring device 4 supervises the monitoring of the power state of the x-ray radiator 20 or, x-ray detector 21 used on site. The x-ray device 1 or 2 or 3 thereby gains additional independence since a monitoring of the power state of x-ray radiator 20 or, x-ray detector 21 is not conducted at a remote monitoring device 4. However, the higher production costs for a system comprising an x-ray device 1 or 2 or 3 and a monitoring device 4 (normally fashioned as a component of the x-ray device 1 or 2 or 3) are disadvantageous.

The monitoring device 4 operated on site, advantageously fashioned as a component of the x-ray device 1 or 2 or 3, can also communicate information (for example regarding the overrun of a parameter threshold) not only to a user but also to a technical service provider so that said service provider is informed of a power state of the x-ray radiator 20 and/or x-ray detector 21.

Figure 3:
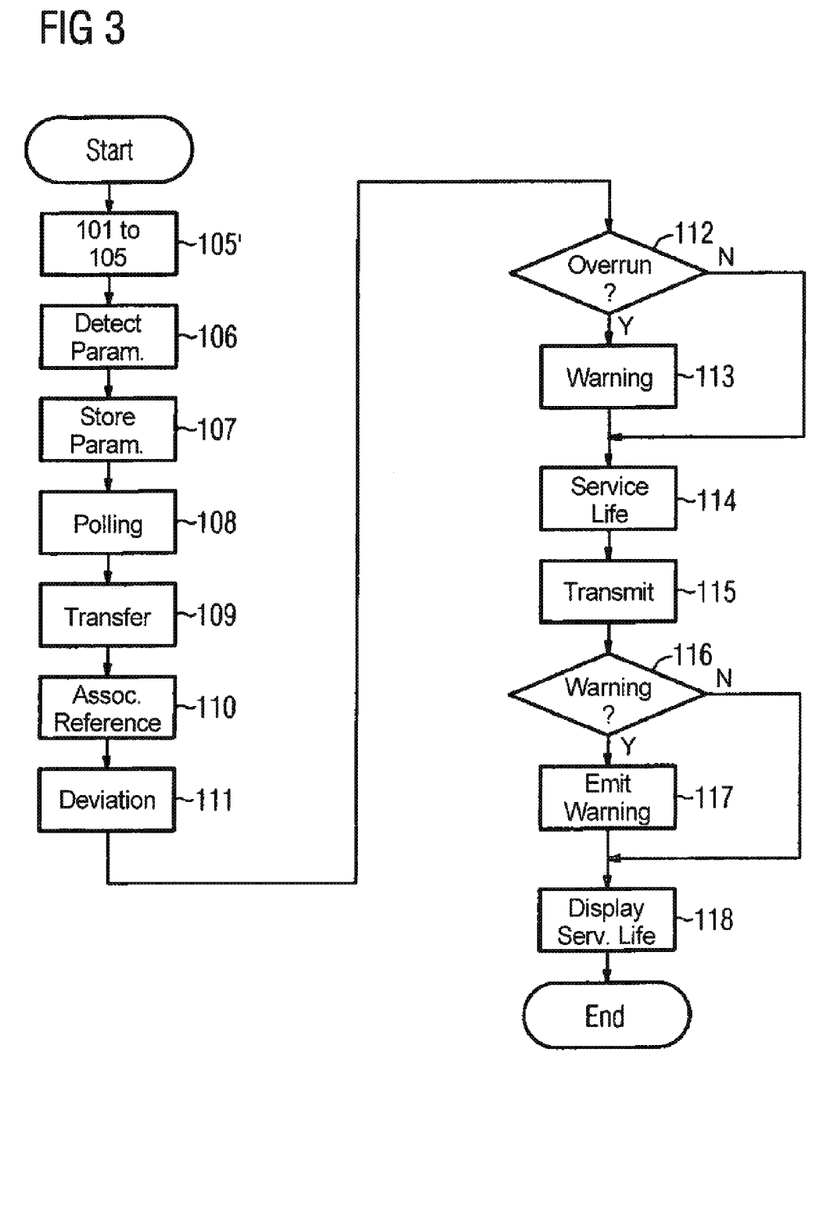
FIG. 3 is a flowchart of a second embodiment of a method for monitoring the power state of an x-ray radiator and/or an x-ray detector in accordance with the present invention.

FIG. 3 shows a flow diagram in which the method steps 101 through 105 presented in FIG. 2 are replaced by a single (but not absolutely necessary) method step 105'. The method executed according to FIG. 3 is likewise a method for monitoring a power state; however, this is suitable only for monitoring a power state of an x-ray detector 21.

In contrast to the method presented in FIG. 2, for the method presented in FIG. 3 it is not required to conduct an x-ray exposure of the x-ray detector 21 in order to enable a monitoring of the power state. A detection of the power state of the x-ray detector can in principle ensue at any time, independent of an x-ray exposure of the x-ray detector 21.

The method shown in FIG. 2 can advantageously be implemented for the x-ray radiator 20 and the method shown in FIG. 3 for the x-ray detector 21. An evaluation of the detected parameters can then be conducted jointly via the monitoring device 4.

To achieve defined test conditions or, to specify a set of test parameters for the x-ray detector 21, in a method step 105' a cover unit or cover hood can be arranged on the x-ray detector 21 such that x-rays (which originate from the natural environment, for example) essentially no longer strike the x-ray detector 21 and are not detected by this. The cover unit can additionally be capable of being heated, for example, in order to provide the same detection conditions (for instance temperature of the x-ray detector 21) in each detection of a parameter characterizing the x-ray detector 21.

The additional method steps of the flow diagram shown in FIG. 3 include the method steps 106 through 118 known from FIG. 2 in order to enable a monitoring of the power state of the x-ray detector.

Although modifications and changes may be suggested by those skilled in the art, it is the intention of the inventors to embody within the patent warranted heron all changes and modifications as reasonably and properly come within the scope of their contribution to the art.

The invention claimed is:

1. A method for monitoring a power state of at least one of an x-ray radiator and an x-ray detector, said method comprising steps of:
   for an x-ray radiator, selecting a set of test parameters that define operation of said x-ray radiator;
   operating said x-ray radiator according to said test parameters to emit x-rays, and causing said x-rays to strike at least a portion of a detector region of an x-ray detector, and detecting said x-rays that strike said portion of said detector region of said x-ray detector;
   during emission of said x-rays and detection of said x-rays, detecting at least one parameter, as a detected parameter that characterizes an operational feature of at least one of said x-ray radiator and said x-ray detector;
   automatically comparing said detected parameter to a reference parameter that represents a reference value for said operational feature to identify a deviation between said detected parameter and said reference parameter; and
   dependent on a magnitude of said deviation, automatically identifying a power state of at least one of said x-ray radiator and said x-ray detector, and providing a humanly perceptible indication of said power state dependent on the identified power state.

2. A method as claimed in claim 1 comprising irradiating an examination subject with said x-rays in an examination of the subject, and setting examination parameters for said examination that coincide with said test parameters, and simultaneously implementing said examination and detection of said detected parameter.

3. A method as claimed in claim 2 comprising employing a region of said detector surface of said x-ray detector, which is not needed for said examination, as said portion of said detector surface with which said detected parameter is detected.

4. A method as claimed in claim 1 comprising placing a test subject between said x-ray radiator and said x-ray detector while emitting said x-rays from said x-ray radiator, and irradiating said test subject with said x-rays.

5. A method as claimed in claim 1 comprising detecting said detected parameter at a plurality of successive points in time, and generating a time curve representing said power state from the respective detected parameters at said successive points in time.

6. A method as claimed in claim 5 comprising automatically determining a remaining service life for at least one of said x-ray radiator and said x-ray detector from said time curve.

7. A method as claimed in claim 6 comprising automatically determining said remaining service life by comparing said time curve with a reference time curve for said reference parameter, and identifying a deviation of said time curve from said reference time curve.

8. A method as claimed in claim 1 comprising automatically polling said detected parameter from a location remote from said x-ray radiator and said x-ray detector.

9. A method as claimed in claim 1 comprising automatically communicating said detected parameter from a site of said x-ray radiator and said x-ray detector to a monitoring unit located at a monitoring site remote from said site of said x-ray radiator and said x-ray detector.

10. A method as claimed in claim 1 comprising comparing said magnitude of said deviation to a threshold and automatically emitting a warning, as said humanly perceptible indication, if said magnitude of said deviation exceeds said threshold.

11. A method as claimed in claim 1 wherein said x-ray detector comprises an x-ray detector matrix, and comprising detecting a spatial noise distribution of said x-ray detector matrix as said detected parameter.

12. A method as claimed in claim 1 wherein said x-ray detector comprises an x-ray detector matrix having rows and columns, and comprising detecting a row noise of said x-ray detector matrix as said detected parameter.

13. A method as claimed in claim 1 wherein said x-ray detector comprises an x-ray detector matrix having rows and columns, and comprising detecting a column noise of said x-ray detector matrix as said detected parameter.

14. A method as claimed in claim 1 comprising detecting a signal-to-noise ratio of said x-ray detector as said detected parameter.

15. A method as claimed in claim 1 comprising detecting a quantum efficiency of said x-ray detector said detected parameter.

16. A method as claimed in claim 1 comprising measuring an intensity of x-rays emitted by said x-ray detector and formulating a parameter characterizing operation of said x-ray detector, as said detected parameter, dependent on said intensity.

17. A method for monitoring a power state of an x-ray detector, said method comprising steps of:
   for an x-ray detector, selecting at least one parameter that defines operation of said x-ray detector;
   operating said x-ray detector according to said at least one test parameter without detection of x-rays, detecting, with said x-ray detector, at least one parameter, as a detected parameter that characterizes an operational feature of said x-ray detector;
   automatically comparing said detected parameter to a reference parameter that represents a reference value for said operational feature to identify a deviation between said detected parameter and said reference parameter; and dependent on a magnitude of said deviation, automatically identifying a power state of said x-ray detector, and providing a humanly perceptible indication of said power state dependent on the identified power state.

18. A method as claimed in claim 17 wherein said x-ray detector comprises an x-ray detector matrix, and comprising detecting a spatial noise distribution of said x-ray detector matrix as said detected parameter.

19. A method as claimed in claim 17 wherein said x-ray detector comprises an x-ray detector matrix having rows and columns, and comprising detecting a row noise of said x-ray detector matrix as said detected parameter.

20. A method as claimed in claim 17 wherein said x-ray detector comprises an x-ray detector matrix having rows and columns, and comprising detecting a column noise of said x-ray detector matrix as said detected parameter.

21. A system for monitoring a power state of at least one of an x-ray radiator and an x-ray detector, said system comprising:

an x-ray radiator;

an x-ray detector;

an input unit allowing selection of a set of test parameters that define operation of said x-ray radiator;

a control unit connected to said input unit that operates said x-ray radiator according to said test parameters to emit x-rays, said x-rays striking at least a portion of a detector region of an x-ray detector, and said x-ray detector detecting said x-rays that strike said portion of said detector region of said x-ray detector;

said x-ray detector, during emission of said x-rays and detection of said x-rays, detecting at least one parameter, as a detected parameter that characterizes an operational feature of at least one of said x-ray radiator and said x-ray detector;

a monitoring unit supplied with said detected parameter that automatically compares said detected parameter to a reference parameter that represents a reference value for said operational feature to identify a deviation between said detected parameter and said reference parameter; and said monitoring unit being configured to automatically identify, dependent on a magnitude of said deviation, a power state of at least one of said x-ray radiator and said x-ray detector, and to provide a humanly perceptible indication of said power state dependent on the identified power state.

22. A system method as claimed in claim 21 wherein said monitoring unit is configured to automatically poll said detected parameter from a location remote from said x-ray radiator and said x-ray detector.

23. A system as claimed in claim 21 comprising a communication link that communicates said detected parameter from a site of said x-ray radiator and said x-ray detector to said monitoring unit located at a monitoring site remote from said site of said x-ray radiator and said x-ray detector.

24. A system for monitoring a power state of an x-ray detector, said system comprising:

an x-ray detector;

an input unit allowing selection of a set of test parameters that define operation of said x-ray detector;

a control unit connected to said input unit that operates said x-ray radiator according to said at least one test parameter without detection of x-rays, said x-ray detector detecting at least one parameter, as a detected parameter that characterizes an operational feature of at least one of said x-ray radiator and said x-ray detector;

a monitoring unit supplied with said detected parameter that automatically compares said detected parameter to a reference parameter that represents a reference value for said operational feature to identify a deviation between said detected parameter and said reference parameter; and said monitoring unit being configured to automatically identify, dependent on a magnitude of said deviation, a power state and said x-ray detector, and to provide a humanly perceptible indication of said power state dependent on the identified power state.

25. A system as claimed in claim 24 wherein said monitoring unit is configured to automatically poll said detected parameter from a location remote from said x-ray radiator and said x-ray detector.

26. A system as claimed in claim 24 comprising a communication link that communicates said detected parameter from a site of said x-ray detector to said monitoring unit located at a monitoring site remote from said site of said x-ray detector.

* * * * *